United States Patent
Kagawa

(10) Patent No.: US 7,448,781 B2
(45) Date of Patent: Nov. 11, 2008

(54) EXTERNAL MIRROR HAVING INDICATOR LIGHT

(75) Inventor: Mamoru Kagawa, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/067,822

(22) Filed: Feb. 28, 2005

(65) Prior Publication Data

US 2005/0231970 A1    Oct. 20, 2005

(30) Foreign Application Priority Data

Apr. 5, 2004    (JP) ............... 2004-110893

(51) Int. Cl.
*B60Q 1/26*    (2006.01)
*F21V 5/00*    (2006.01)
(52) U.S. Cl. .............. 362/494; 362/501; 362/520
(58) Field of Classification Search ............ 362/494, 362/501, 520
See application file for complete search history.

(56) References Cited

U.S. PATENT DOCUMENTS

| | | | |
|---|---|---|---|
| 6,325,517 B1 * | 12/2001 | Kuo | ............ 362/494 |
| 7,220,030 B2 | 5/2007 | Yagi | |
| 7,278,767 B2 | 10/2007 | Takahashi et al. | |
| 2002/0057575 A1 | 5/2002 | Schwanz et al. | |
| 2003/0179583 A1 | 9/2003 | Matsumoto et al. | |
| 2003/0193815 A1 | 10/2003 | Mishimagi | |
| 2004/0190303 A1 * | 9/2004 | Mishimagi | ............ 362/494 |
| 2004/0213009 A1 | 10/2004 | Yagi | |
| 2005/0231970 A1 | 10/2005 | Kagawa | |
| 2005/0254251 A1 | 11/2005 | Chou | |

FOREIGN PATENT DOCUMENTS

| | | |
|---|---|---|
| CN | 1521051 | 8/2004 |
| JP | 03-63431 | 3/1991 |

(Continued)

OTHER PUBLICATIONS http://www.spondylitis.org/patient_resources/glossary.aspx.*

*Primary Examiner*—Ali Alavi
*Assistant Examiner*—William J Carter
(74) *Attorney, Agent, or Firm*—Carrier, Blackman & Associates, P.C.; William D. Blackman; Joseph P. Carrier

(57) ABSTRACT

An external mirror includes an indicator light and a case with a protruding portion whose outer face is arranged more outside than an outer face of the indicator light. Even when the external mirror hits or bumps against an obstacle, the protruding portion is the first and likely only portion which hits or bumps against the obstacle thereby preventing the indicator light from being damaged. Therefore, the indicator light will have to be replaced less frequently, thereby reducing a burden on the user. Typically, the protruding portion is provided below the indicator light. Accordingly, the indicator light can be strongly protected with respect to the contact from a lower side of the external mirror, where there are generally a relatively large number/percentage of obstacles. Preferably, the indicator light has a convex surface lens which protrudes toward outside of the external mirror. Preferably, the protruding portion has a ridge line between an upper face and a lower face of the protruding portion.

21 Claims, 3 Drawing Sheets

FOREIGN PATENT DOCUMENTS

| | | |
|---|---|---|
| JP | 03-63431 | 6/1991 |
| JP | 08-142745 | 4/1996 |
| JP | 09-030329 | 4/1997 |
| JP | 2000-103287 | 4/2000 |
| JP | 2000-203287 | 4/2000 |
| JP | 2002-337606 | 11/2002 |
| JP | 2003-237460 | 8/2003 |
| JP | 2004-291671 | 10/2004 |

* cited by examiner

EXTERNAL MIRROR HAVING INDICATOR LIGHT

BACKGROUND OF THE INVENTION

1. Field of the Invention

The present invention relates to an external mirror having an indicator light.

Priority is claimed on Japanese Patent Application No. 2004-110893, filed Apr. 5, 2004, the content of which is incorporated herein by reference.

2. Description of Related Art

Conventionally, door mirrors having a direction indicator light are known. The known direction indicator light for a door mirror is provided at a height close to the position of the eyes of the driver of an oncoming car running on the opposite lane and is provided at a place which horizontally protrudes, thereby being highly visible (see Japanese Unexamined Patent Application, First Publication No. 2000-103287, etc.)

Regarding the direction indicator light of the above-explained conventional door mirror, visibility from the back side and the (left or right) side of the car is also required; thus, the direction indicator light is usually formed over the side of the door mirror. Therefore, when the door mirror contacts or hits an obstacle, the direction indicator light may be damaged.

In order to prevent the direction indicator light from being damaged, the arrangement area of the door mirror, and also the area extending to the side of the door mirror, may be reduced. However in this case, it is difficult to ensure necessary visibility.

SUMMARY OF THE INVENTION

In consideration of the above circumstances, an object of the present invention is to provide an external mirror for preventing an indicator light from being damaged while ensuring required visibility.

Therefore, the present invention provides an external mirror (e.g., a door mirror 3 in an embodiment explained below) having an indicator light (e.g., an indicator light 14 in the embodiment), wherein the external mirror has a protruding portion (e.g., a protruding portion 8 in the embodiment) whose outer face is arranged more outside or further outwardly than an outer face of the indicator light.

According to this structure, even when the external mirror hits or bumps against an obstacle, the protruding portion will typically be the first and only portion which hits or bumps the obstacle because of its protruding nature, thereby preventing the indicator light from being damaged. Therefore, the indicator light will have to be replaced less frequently, thereby reducing a burden on the user.

Typically, the protruding portion is provided below the indicator light. Accordingly, the indicator light can be strongly protected with respect to the contact from a lower side of the external mirror, where there are a relatively large number of obstacles. Therefore, damage to the indicator light can be reduced and the burden on the user can be further reduced. In addition, in this case, no protruding portion is provided above the indicator light, thereby improving visibility of the indicator light and improving salability of the vehicle.

The indicator light may have a convex surface lens (e.g., a lens portion 15 in the embodiment) which protrudes toward the outside of the external mirror.

According to this structure, the outer face of the indicator light includes a convex portion; thus, a wider interior space can be secured, thereby improving flexibility of arranging functional components in the case. As a result, flexibility of design of the external mirror can be improved and visibility of the indicator light from multiple directions can also be improved, thereby further improving salability of the vehicle.

The protruding portion may have a ridge line (e.g., a ridge line 12 in the embodiment) between an upper face and a lower face of the protruding portion (refer to the upper portion 10 and the lower portion 11 in the embodiment).

Accordingly, the air current is divided into two air currents at the ridge line as a boundary. One of the air currents bumps against the indicator light while flowing along the upper face of the external mirror and then is drawn to the mirror face side of the external mirror; however, the other air current is drawn to the mirror face side after flowing along the lower face of the external mirror, which has no indicator light. Therefore, different air currents are respectively generated on the upper and lower faces of the external mirror. Therefore, vibration of the mirror due to competition of air currents at the mirror face side can be suppressed, thereby improving stillness.

Preferably, a clearance is secured between an outer edge of the indicator light and an outer edge of the protruding portion in plan view.

Also preferably, a clearance is secured between an outer edge of the indicator light and an outer edge of the protruding portion in front view.

Typically, the indicator light is a direction indicator light.

DETAILED DESCRIPTION OF THE INVENTION

Hereinafter, embodiments according to the present invention will be explained with reference to the drawings.

Figure 1:
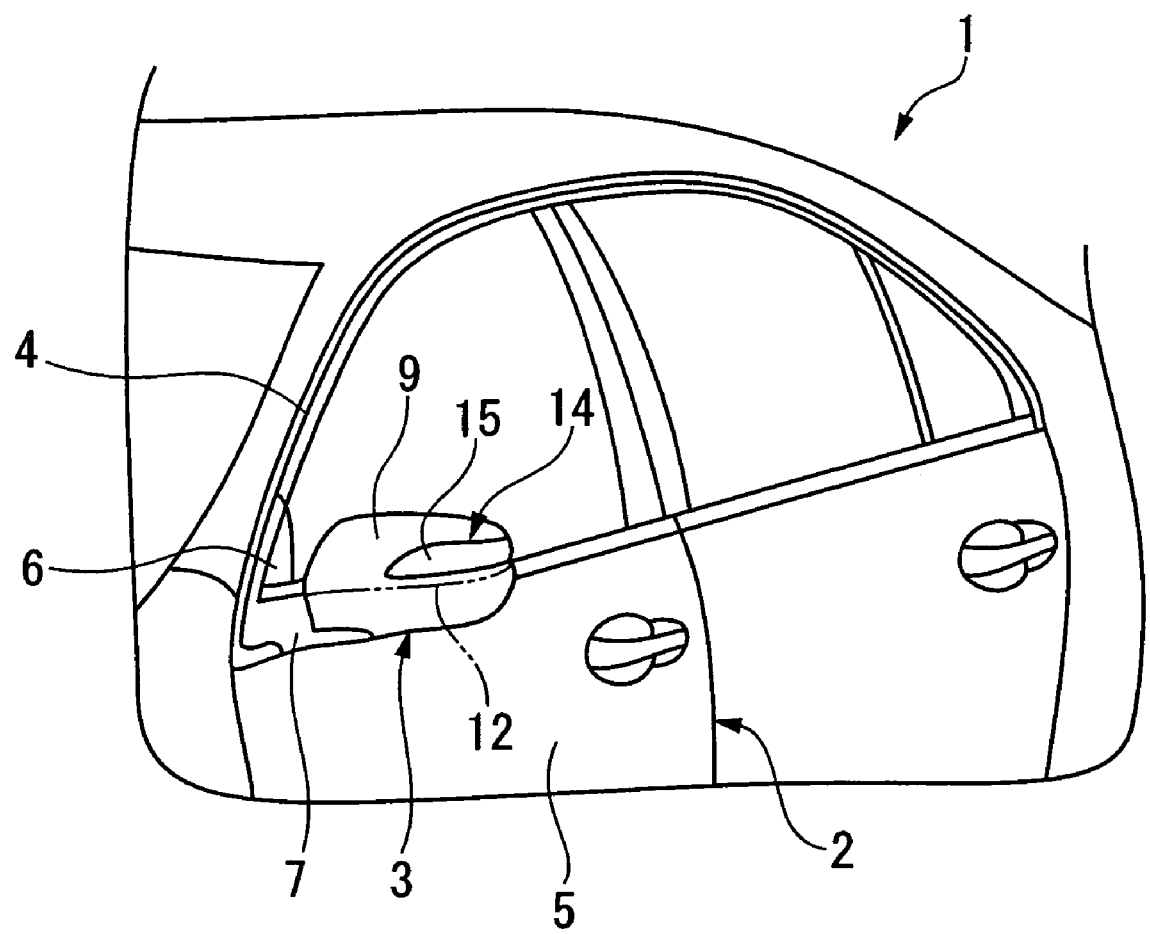
FIG. 1 is a perspective view showing the structure of the vehicle in an embodiment according to the present invention.

As shown in FIG. 1, a door mirror 3 (i.e., an external mirror) is provided at a front door 2 of a vehicle 1 such as a car. More specifically, a mirror base 6 having a substantially triangular shape is attached to a corner of a main body 5 of the front door 2, where the corner is formed by a front sash 4 and an upper end of the main body 5. A case 9 is attached to a support 7 provided on the mirror base 6, in a manner such that the case 9 can freely bend in the front-back direction.

Figure 2:
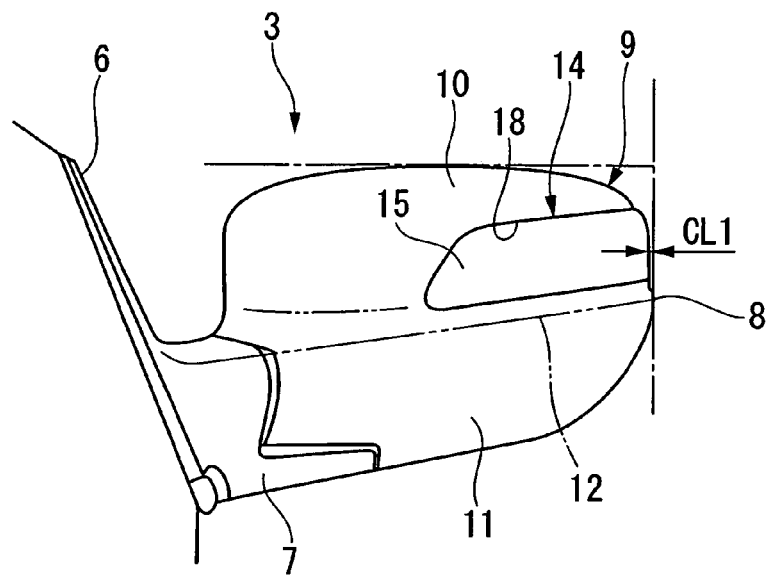
FIG. 2 is a front view showing a door mirror in the embodiment.
Figure 3:
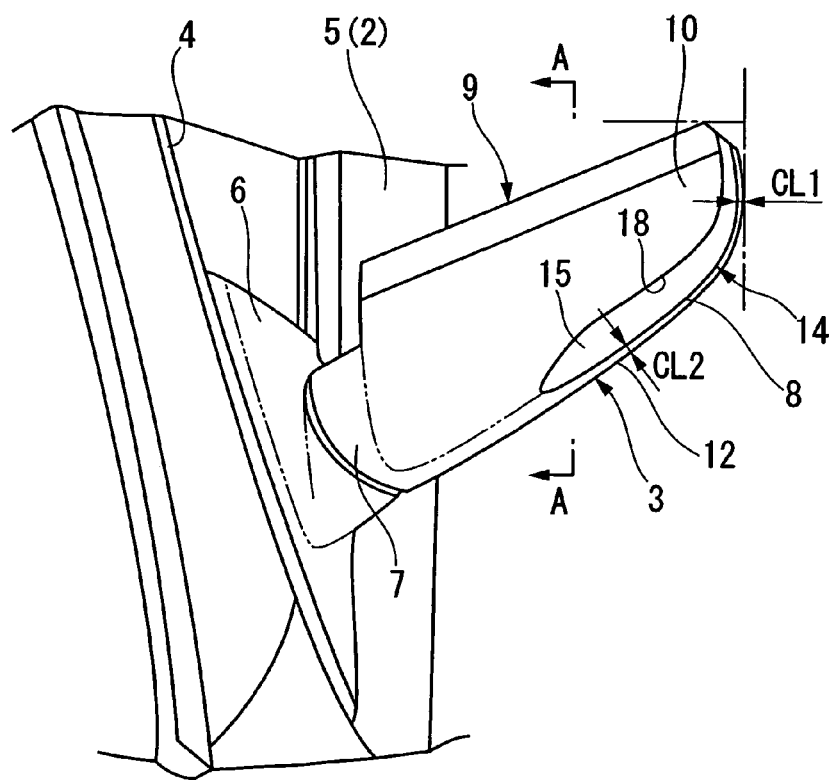
FIG. 3 is a top view showing a door mirror in the embodiment.

As shown in FIG. 2, the door mirror 3 has a protruding portion 8 on a front face of the case 9, where the protruding portion 8 extends in the width direction of the vehicle. As shown in FIG. 3, the protruding portion 8 is formed over an outer side face of the case 9. A ridge line 12, by which the upper portion (or face) of the front face of the case 9 is separated from the lower portion (or face) of the front face, is formed along the protruding portion. As shown in FIG. 2, the ridge line 12 functions as a boundary between (i) the lower portion 11 of the case 9, whose side edge draws a line gradually rising toward the ridge line 12 and (ii) the upper portion 10 of the case 9, whose outer side edge draws a line rising from the vehicle body side and gently extending toward a direction away from the vehicle, and then gently falling toward a vicinity of the ridge line 12.

As shown in FIG. 3, the case 9 is attached to the support 7 in a manner such that the front face of the case 9 is slightly inclined toward the back side, so that a mirror body 13 (shown in FIG. 4) arranged on the back face of the case 9 is inclined toward the back side so as to visibly recognize the back side.

On the upper portion 10 of the case 9, a indicator light 14, used as a direction indicator light, is attached from the front face to the side face of the case 9, where the indicator light 14 is formed from approximately a center of the upper portion of the case 9 in the width direction of the vehicle and has a width substantially half of the width of the upper portion in the vertical direction. Therefore, the ridge line 12 exists below the indicator light 14.

Figure 4:
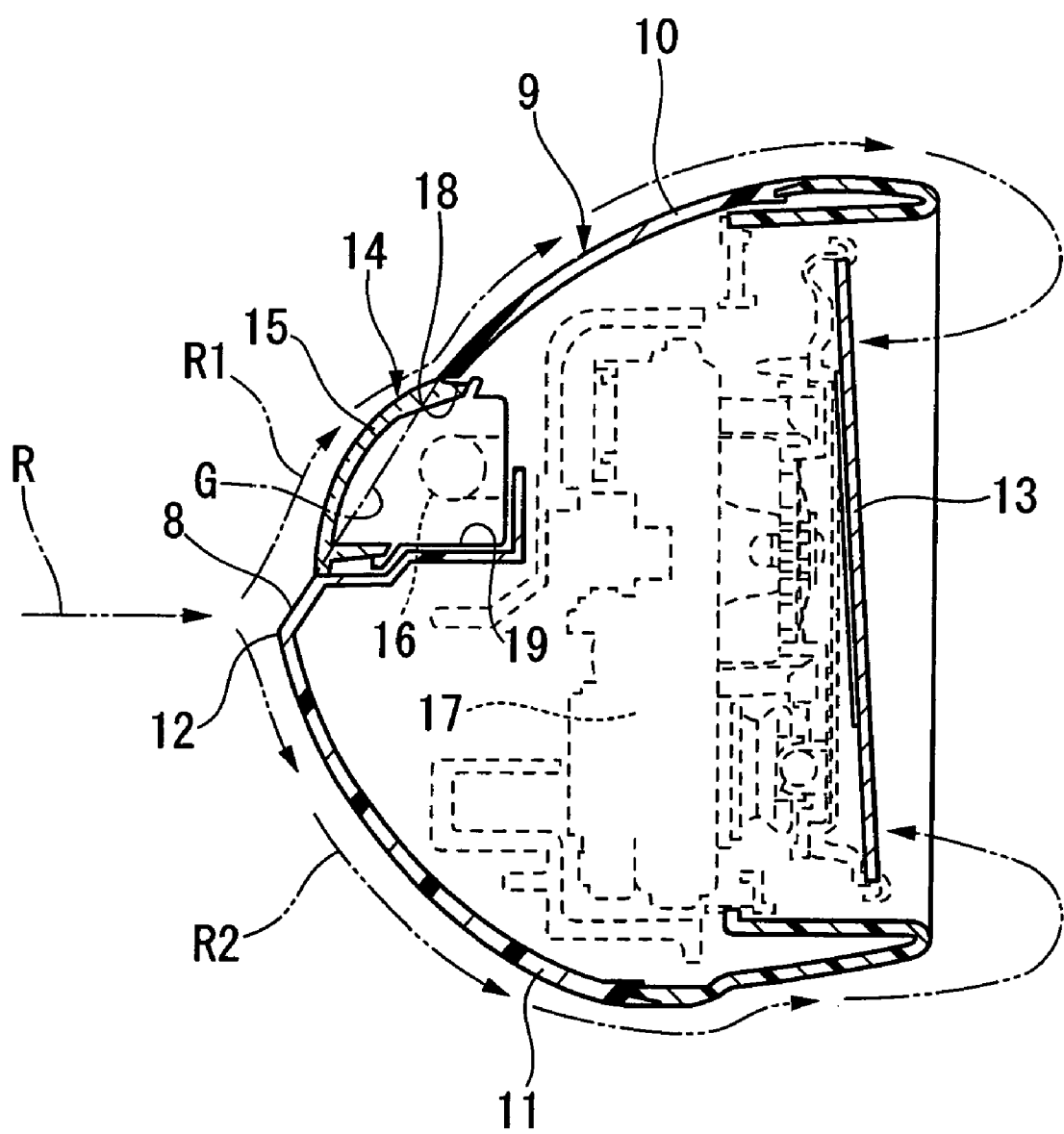
FIG. 4 is a sectional view along line A-A in FIG. 3.

More specifically, as shown in FIG. 4, the indicator light 14, having a lens portion 15 (a surface lens) and a bulb 16, is positioned in front of the mirror body 13 and a driving device 17 for driving the mirror body in a manner such that the mirror body can be freely inclined. Here, a rear portion of the case 9, that is, a portion which surrounds the mirror body 13, is detachable, that is, this portion can be detached when the mirror body 13 or the driving device 17 is replaced.

As shown in FIGS. 2 and 3, in front or plan view, the outside end of the ridge line 12 is more externally positioned in comparison with the outside line of the indicator light 14, so as to secure a clearance CL1. In addition, as shown in FIG. 3, in plan view, the front edge of the ridge line 12 is positioned foremost in comparison with the outside line of the indicator light 14 (i.e., the foremost edge of the indicator light 14), so as to secure a clearance CL2. The clearance CL2 continues toward the side of the indicator light and is joined to the clearance CL1.

As shown in FIG. 4, the indicator light 14 has the lens portion 15 which is convex, that is, protrudes outwardly beyond the outer contour line G of the upper portion 10 of the case 9, and the indicator light 14 is fit to an opening 18 formed in an area (on the upper portion 10) where the indicator light 14 should be arranged. Here, a lower portion of the lens portion 15 is supported by a base 19 which is formed toward the inside of the case 9 along the opening 18.

Therefore, according to the present embodiment, when observed from the front face side (see FIG. 2), the clearance CL1 is secured between the outside end of the ridge line 12 and the outer side line of the indicator light 14; thus, the ridge line 12 is the first and likely only portion of the mirror unit 3 which hits or bumps against an obstacle approaching from the side, so that the outer side of the indicator light 14 is not damaged. Additionally, in plan view as shown in FIG. 3, the clearance CL2 is secured between the front edge of the ridge line 12 and the outside edge of the indicator light 14; thus, again, the ridge line 12 is the first and likely only portion of the mirror unit 3 which hits or bumps against an obstacle approaching from the front side, so that the front side of the indicator light 14 is not damaged. Generally, there are a relatively large number/percentage of obstacles at a level below the case 9. However, such obstacles do not hit the indicator light 14 which is provided at the upper portion of the case 9; thus, the indicator light 14 is not damaged by obstacles below the case 9. Accordingly, the frequency of replacing the indicator light 14 due to damage is reduced, thereby reducing a burden on the user.

In addition, as shown in FIG. 4, the lens portion 15 is provided, which is convex and protrudes from the outer line G of the upper portion 10 of the case 9; thus, a wider interior space can be secured in the case 9, thereby improving flexibility of arranging functional components in the case 9. As a result, flexibility of design of the case 9 can be improved and visibility of the indicator light 14 from multiple directions can also be improved, thereby further improving salability of the vehicle.

FIG. 4 also shows air current R from the front direction of the case 9, where the air current R is divided into air current R1 and air current R2 at the ridge line 12 as a boundary. The air current R1 bumps against the indicator light 14 while flowing along the upper face of the case 9 and then is drawn to the mirror body 13 side; however, the air current R2 is drawn to the mirror body 13 side after flowing along the lower face of the case 9, which has no indicator light 14. Therefore, different air currents R1 and R2 are respectively generated on the upper and lower faces of the case 9. Therefore, vibration of the mirror body 13 due to competition of air currents at the mirror body 13 can be suppressed, thereby improving stillness.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the external mirror is not limited to a door mirror and may be a fender mirror, and the indicator light is not limited to a direction indicator light (as in the explained embodiment) and may be an indicator light for calling attention to an oncoming car.

What is claimed is:

1. An external mirror having an indicator light, wherein the external mirror comprises a case comprising a front face and an outer side face, the case having an opening formed therein for receiving said indicator light, and a mirror disposed in the case, wherein the case has a cross-sectional shape defined by a substantially continuous contour line, wherein said opening extends continuously and uninterruptedly from a portion of the front face around to the outer side face, wherein the indicator light comprises a lens portion which fits in the opening of the case and which comprises an outwardly bulging portion which extends outwardly beyond the contour line of the case, said indicator light extending from the front face around to the outer side face of the case, and wherein the case has a protruding portion extending from the front face around to the outer side face, wherein the protruding portion has an outer face which is arranged more outside than an outer face of the outwardly bulging portion of the lens of the indicator light, in both the width and length directions of the vehicle, whereby a low-speed scraping contact between a stationary vertical surface and a widthwise outermost portion of the mirror will take place between the case and the surface, rather than between the outwardly bulging portion of the lens and the surface.

2. An external mirror as claimed in claim 1, wherein the protruding portion is provided at a medial portion of the case below the indicator light.

3. An external mirror as claimed in claim 1, wherein the lens portion of the indicator light has a convex surface which protrudes outwardly from the external mirror case.

4. An external mirror as claimed in claim 1, wherein the protruding portion has a ridge line thereon, and wherein the ridge line is disposed between an upper face and a lower face of the protruding portion.

5. An external mirror as claimed in claim 1, wherein a clearance is secured between the outer surface of the case of the mirror and the outer surface of the lens portion of the indicator light, in the width direction of the vehicle, and the lens portion of the indicator light curves substantially the same as the outer surface of the case towards the rear of the vehicle, wherein the lens case cover is one continuous piece and can be viewed from the front, side and rear of the vehicle.

6. An external mirror as claimed in claim 1, wherein the indicator light is a direction indicator light.

7. An external mirror as claimed in claim 1, further comprising a mirror base for fixedly attaching to a vehicle body, wherein the case is movably attached to said mirror base.

8. An external mirror as claimed in claim 1, wherein:
the protruding portion has a ridge line thereon;
the ridge line is positioned at a medial portion of the case, and divides the outer surface of the case into an upper surface as the upper half and a lower surface as the lower half.

9. An external mirror having an indicator light, wherein the external mirror comprises
a hollow case comprising a case wall having a front face and an outer side face, the case wall having an opening formed therein for receiving said indicator light, and further having an interior space formed therein,
a mirror disposed in the case,
wherein the case has a cross-sectional shape defined by a substantially continuous contour line,
wherein the case further comprises a support base formed integrally with the case wall and extending inwardly away from the case wall into the interior space of the case to define a substantially horizontal platform, the support base being joined to the case wall at a location proximate a bottom of the opening,
wherein the indicator light comprises a lens portion which fits in the opening of the case, the lens portion comprising an outwardly bulging portion which extends outwardly beyond the contour line of the case,
wherein part of the lens portion rests on and is supported by the support base,
wherein the case has a protruding portion whose outer face is arranged more outside than an outer face of the outwardly bulging portion of the lens of the indicator light, in the width direction of the vehicle, and wherein a clearance is secured between an outer edge of the indicator light and an outer edge of the protruding portion in side plan view.

10. An external mirror as claimed in claim 9, wherein a first clearance is secured between an outer edge of the indicator light and an outer edge of the protruding portion in side plan view, and a second clearance is secured between the outer edge of the indicator light and the outer edge of the protruding portion in front view, said second clearance extending continuously from said first clearance.

11. An external mirror as claimed in claim 9, wherein the support base further comprises a substantially vertical flange extending upwardly from an inner portion of the platform.

12. An external mirror for a vehicle, said mirror comprising:
a case having an opening formed therein for receiving an indicator light, wherein the case comprises a front surface and a side surface integrally connected to said front surface, said opening extending continuously and uninterruptedly from the front surface of said case around to the side surface of said case, wherein the case has a cross-sectional shape defined by a substantially continuous contour line;
a mirror body disposed in said case;
and an indicator light disposed in said case with a lens portion thereof disposed in the opening of said case, said lens portion extending from the front surface of said case around to the side surface of said case, wherein the lens portion of the indicator light comprises an outwardly bulging portion which extends outwardly beyond the contour line of the case;
wherein the case has a protruding portion whose outer face is arranged more outside than an outer face of the outwardly bulging portion of the lens of the indicator light, both the width and length directions of the vehicle.

13. An external mirror as claimed in claim 12, wherein the protruding portion is provided medially below the indicator light.

14. An external mirror as claimed in claim 12, wherein the lens portion of the indicator light is disposed in an opening formed in said case and has a convex surface which protrudes outwardly from the case.

15. An external mirror as claimed in claim 12, wherein the protruding portion has an outermost ridge line thereon, wherein the ridge line is disposed between an upper face and a lower face of the protruding portion.

16. An external mirror as claimed in claim 15, wherein said case has upper and lower portions and the ridge line is disposed at a junction between the upper and lower portions of said case.

17. An external mirror as claimed in claim 12, wherein a clearance is secured between an outer edge of the indicator light and an outer edge of the protruding portion in side plan view.

18. An external mirror as claimed in claim 12, wherein a clearance is secured between the outer surface of the case of the mirror and the outer surface of the lens portion of the indicator light, in the width direction of the vehicle.

19. An external mirror as claimed in claim 12, wherein a first clearance is secured between an outer edge of the indicator light and an outer edge of the protruding portion in plan view, and a second clearance is secured between the outer edge of the indicator light and the outer edge of the protruding portion in front view, said second clearance extending continuously from said first clearance.

20. An external mirror as claimed in claim 12, wherein the indicator light is a direction indicator light.

21. An external mirror as claimed in claim 12, wherein:
the protruding portion has a ridge line thereon;
the ridge line is positioned at a medial portion of the case, and divides the outer surface of the case into an upper surface as the upper half and a lower surface as the lower half.

* * * * *